July 14, 1925.

C. L. MICHOD

VEHICLE STAY DEVICE

Filed Dec. 1, 1924

1,545,594

Inventor:
Charles L. Michod,
by Reston, Hibben, Davis & Macauley
Atty's

Patented July 14, 1925.

1,545,594

UNITED STATES PATENT OFFICE.

CHARLES L. MICHOD, OF CHICAGO, ILLINOIS, ASSIGNOR TO E. S. EVANS & CO., INC., OF DETROIT, MICHIGAN, A CORPORATION OF DELAWARE.

VEHICLE-STAY DEVICE.

Application filed December 1, 1924. Serial No. 753,042.

*To all whom it may concern:*

Be it known that I, CHARLES L. MICHOD, a citizen of the United States, residing at Chicago, in the county of Cook and State of Illinois, have invented certain new and useful Improvements in Vehicle-Stay Devices, of which the following is a specification.

This invention relates to stay blocks or devices for vehicle wheels and more particularly to devices which are adapted to be fastened to the floor of a car or the like, in which the vehicle is being transported, for the purpose of preventing movement of the vehicle.

Heretofore, it has been customary to provide stay blocks adapted to prevent longitudinal and lateral movement of the vehicle on the floor of the car and to provide additional devices (commonly called tie-downs) designed to retain the tires (or rims) on the wheels in firm engagement with the floor thus preventing the wheels from rising off the floor due to jerking or bumping of the car, which would result in chafing of the tires and undue jarring of the vehicle. It is the principal object of my invention to provide stay devices which are adapted to perform the functions of stay blocks and tie-downs, thus using one device for each wheel to perform these functions rather than two devices, as has been customary prior to my invention. For the purpose of carrying out my invention, I provide four stay members, one for each wheel, each member having a curved portion adapted to engage the periphery of the tire above its horizontal diameter.

It is also an object of my invention to provide the stay devices with means for preventing lateral or axial movement of the wheels of the vehicle.

A further object of my invention is to construct the stay devices and mount them in relation to the wheels of the vehicle so that the stay devices are between the wheels on each side of the vehicle, thus permitting the vehicles to be stored closer together, end to end, than would be practical were the stay devices arranged in front of the front wheels and behind the rear wheels.

With the above and incidental objects in view, the invention consists in certain novel features of construction and combination of parts, the essential elements whereof are recited in the appended claims, and a preferred form of embodiment of which is described in detail hereinafter and illustrated in full in the accompanying drawings which form part of this specification.

Figure 1:
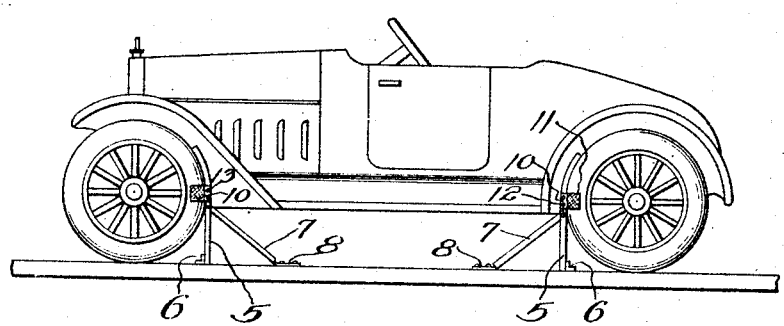
Figure 2:
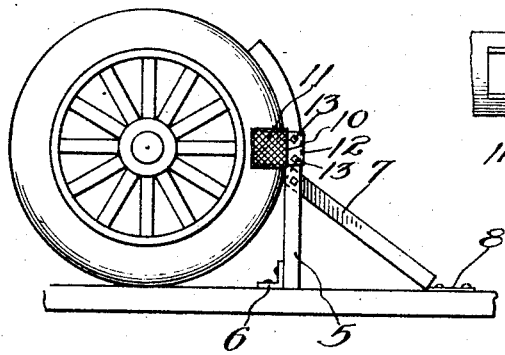
Figure 3:
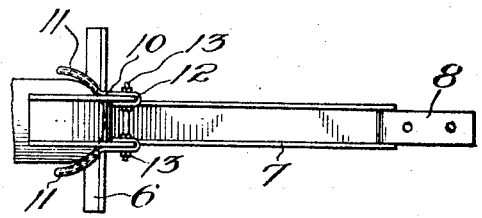

In the drawings, Fig. 1 is an elevational view of the vehicle showing the front and rear wheels equipped with devices embodying my invention; Fig. 2 is an enlarged side view of one of the vehicle wheels showing my stay device in assembled relation thereto; and Fig. 3 is a top plan view of one of my devices showing its application to one of the wheels, a fragment of the tire of which is shown.

Each stay device comprises a vertical member 5 the upper portion of which is curved to conform to the curvature of the tire on the wheel of the vehicle, to be held in position. Bolted to the lower end of the member 5 is an angle iron 6 adapted to be secured to the floor of the car in any suitable manner. The member 5 is channel-shaped in cross section in order to give it adequate strength. Secured to the flanges of the member 5 about midway between its ends and within its channel is the upper end of a channel bar or brace 7 provided at its lower end with a horizontal integral plate 8 adapted to be secured to the floor of the car in any suitable manner. If desired, the upper end of the bar 7 may be secured to the stay member 5 by means of a single bolt which would permit the member 7 to be swung relative to the member 5 in order to position it in the channel of the member 5 and thus facilitate shipment of the device when not in use. Secured to each flange of the stay member 5, at the point approximately at the upper end of the straight vertical portion of the member 5 is an arm or clip 10 having an arcuate portion 11 and a hook shaped securing portion 12 fitting over the flange of the member 5 with bolts 13 projecting through both arms of the hook portion 11 and the flange of the member 5 to secure the clip 10 in place. The curved portions of the clips are preferably wrapped with cloth or other flexible material as these portions are adapted to engage the side of the tires and the flexible material prevents chafting of the tires by the clip devices.

When an automobile is secured in position in a freight car, boat, or the like, stay devices, as above described, are positioned in relation to the wheels of the automobile as shown in Fig. 1. There is one of these devices for each wheel and the devices on each side of the car are positioned between the wheels. The upper curved portions of the stay members 5 are curved to conform to the periphery of the tire and these curved portions are adapted to engage the periphery of the tires above the horizontal diameters of the wheels and thus the stay members prevent longitudinal movement of the vehicle either forwardly or rearwardly, and at the same time the curved portions of the said members hold the tires firmly against the floor. The lateral arms or clips 10 engage the sides of the tires, approximately on the horizontal diameters of the wheels and thus prevent lateral movement of the wheels.

Therefore, it will be obvious that I use but four stay devices which prevent longitudinal, lateral, and vertical movements of the wheels and these devices are so positioned between the wheels that the vehicles may be stored close together end-to-end in the car, there being no interference between the stay devices for one car and the stay devices for the adjacent cars.

While I have shown in my drawings an automobile having pneumatic tires, it will be obvious that my invention is adapted for use in connection with the transporting of vehicles having solid tires or no tires at all, the said devices then being adapted to cooperate with the felloes or rims of the wheels.

I claim:

1. A stay device of the character described, having a member with a vertical lower portion and a curved upper portion conforming to and adapted to engage a tire of the vehicle above the horizontal diameter of the tire to retain the tire in contact with the vehicle supporting means.

2. A stay device of the character described, having a member with a vertical lower portion and a curved upper portion conforming to and adapted to engage a tire of the vehicle above the horizontal diameter of the tire to retain the tire in contact with the vehicle supporting means and means secured to the member for preventing axial movement of the tire.

3. A stay device of the class described comprising a member adapted to be secured to the vehicle supporting means and having a curved upper portion engaging the periphery of a tire of the vehicle above the horizontal diameter and below the highest point on the vertical diameter of the tire, curved projecting arms secured to said member and engaging the sides of the tire to prevent axial movement thereof, and a brace secured to said member at one end and to the vehicle supporting means at its opposite end.

4. In combination with a vehicle, of four stay devices, one for each wheel, each comprising a member having a lower vertical portion and a curved upper portion adapted to engage the tire above the horizontal diameter and below the highest point on the vertical diameter of the tire to retain the tires in engagement with the vehicle supporting means and prevent longitudinal movement of the vehicle.

5. In combination with a vehicle, of four stay devices, one for each wheel and positioned between the wheels and each comprising a member having a curved portion conforming to the curvature of the periphery of the tires and adapted to engage the tires above their horizontal diameter to retain the tires in engagement with the vehicle supporting means and prevent longitudinal movement of the vehicle, and a brace member for each member pivoted at its upper end to the member and adapted to be secured at its lower end to the vehicle supporting means.

6. In combination with an automobile, of four stay devices, one for each wheel and positioned between the wheels and each comprising a vertical member for preventing longitudinal movement of the vehicle and retaining the tires in engagement with the vehicle supporting means, the upper portions of the members being curved to engage the periphery of the tires above the horizontal diameter of the tires, and means secured to said members for preventing lateral movement of the wheels of the vehicle.

7. In combination with a vehicle, of four stay devices, one for each wheel, each comprising a member having a lower vertical portion and a curved upper portion adapted to engage the tire above the horizontal diameter and below the highest point on the vertical diameter of the tire to retain the tires in engagement with the vehicle supporting means and prevent longitudinal movement of the vehicle and curved arms secured to each member and adapted to engage the sides of the tires to prevent axial movement thereof.

8. In combination with a vehicle, the four stay devices, one for each wheel, each comprising a member having its upper end curved to conform with the periphery of the tire and adapted to engage the tire above the horizontal diameter and below the highest point on the vertical diameter of the tire to retain the tires in engagement with the vehicle supporting means and prevent longitudinal movement of the vehicle, and two padded arms on each member, each arm being curved to conform to the curvature of the tire and adapted to engage the side of the tire at substantially its horizontal diameter to prevent lateral movement of the vehicle.

CHARLES L. MICHOD.